United States Patent [19]

Kolodziej

[11] Patent Number: 4,875,571

[45] Date of Patent: Oct. 24, 1989

[54] UNLOADING METHOD AND APPARATUS FOR A CABLE FINISHING SYSTEM

[75] Inventor: Helmut Kolodziej, Maintal, Fed. Rep. of Germany

[73] Assignee: Statomat-Globe Maschienenfabrik GmbH, Niederdorfelden, Fed. Rep. of Germany

[21] Appl. No.: 134,799

[22] Filed: Dec. 18, 1987

[30] Foreign Application Priority Data

Dec. 18, 1986 [DE] Fed. Rep. of Germany ....... 3643201

[51] Int. Cl.[4] ............................................... B65G 47/26

[52] U.S. Cl. ................................. 198/431; 198/468.6; 226/104; 414/27; 414/798.4

[58] Field of Search .................. 198/468.6, 431, 803.9; 414/77, 91, 798.4; 226/104–107; 271/175

[56] References Cited

U.S. PATENT DOCUMENTS

| | | | |
|---|---|---|---|
| 2,766,045 | 10/1956 | Morgan et al. | 271/175 |
| 2,855,089 | 10/1958 | Griffin | 271/175 |
| 3,283,398 | 11/1966 | Andren | 198/803.9 X |
| 3,372,815 | 3/1968 | Lovendusky | 414/78 |
| 3,485,490 | 12/1969 | Ramsey et al. | 271/175 |
| 3,704,884 | 12/1972 | Nicolay et al. | 271/175 X |
| 4,030,174 | 6/1977 | Buttner et al. . | |
| 4,624,615 | 11/1986 | Russell et al. | 271/175 X |

*Primary Examiner*—Robert J. Spar
*Assistant Examiner*—D. Glenn Dayoan
*Attorney, Agent, or Firm*—Albert L. Jeffers; Anthony Niewyk

[57] ABSTRACT

An unloading process and apparatus for a cable finishing system. The process is characterized in that finished cables are each picked up, during finishing, at a locally determined point of the cables by the controlled conveying operation and are pulled across a depository (10), whereafter the picked up cable point is released in a specific position.

9 Claims, 7 Drawing Sheets

$\geq 4100$ — $7000 = L$ $$l = \frac{L - (1600 + 600)}{3}$$

$\geq 3500$ — 4100

2500 — 3500

UNLOADING METHOD AND APPARATUS FOR A CABLE FINISHING SYSTEM

BACKGROUND OF THE INVENTION

The invention pertains to an unloading method and apparatus for a cable finishing system.

For the finishing of cables two fundamentally different system types are available, which differ in their design and in the way in which the cable is picked up and conveyed. In one type of system the cables, arranged in parallel, are fed to the processing stations, in a direction transverse to their cable lengths, and with the cable ends pointing in opposite directions (German patent document No. 24 40 264). In the other type of system the cables, prior to the finishing operation, are laid out in loops so that the two ends of the cable pass through the individual processing stations, which are arranged in a single row, while the cables are arranged in parallel and side-by-side (U.S. Pat. No. 3,283,398). Today, both types of systems are used side-by-side for various finishing applications. The finishing process can, in most cases, be followed by additional manufacturing steps. The further processing may consist in the attachment of additional installation parts on the cable, the installation of the cable in an appliance or in the packaging of the cable. In doing so, the two ends of the finished cable are normally processed differently.

Unloading from such systems is today handled in a very simple way by an operator. For the cables not to simply drop on the floor upon completion of the finishing operation, the arrangement of a receiving station at the end of the system was previously known. This receiving station consists of hook-shaped bars on which the finished cable drops from the end of the system conveyor. The cables then rest irregularly on the bars and are periodically removed by the operator, straightened out, gathered, bundled and placed on a frame suited for further processing. In finishing systems where the cable ends are being fed parallel and side-by-side through the system, another operation must be performed by the operator, in addition to those described before. The cables drop on the receiving station in the same form in which they are passed through the system. But since the different cable ends require various types of processing, the operator must, prior to the "straightening" operation, perform the operation of "separating the cable ends".

Thus, in the described type of finishing system, unloading requires a great amount of manual labor and expense. At the same time, the number of cables produced per hour on the system depends on the efficiency of the operator. If the system produces more cables than the operator can remove, backup of cables will occur on the end of the system and the cables may become tangled. The prior method can, for these reasons, not be used on systems that possess a considerably higher capacity.

SUMMARY OF THE INVENTION

The problem underlying the invention is to provide a method and apparatus of the initially cited type which can be used universally with any finishing system and which reduces the number of manual operations.

The above problem is solved in that the finished cables are picked up at a point which is determined locally by the controlled feed operation during the finishing and pulling of the cables over a depository, whereafter the pick-up point is released in a specific position.

The proposed method can be used without any further measures both with the first and second type of systems. The pickup and release of each cable always at the same point of each cable ensures that the cables will lie on the depository in an orderly fashion for further production operations. The pull motion in depositing the cables ensures that the two cable ends, irrespective of the way in which a cable passes through the respective system, will be spatially separated for their different further processing.

An apparatus is provided for practising the application of the new method which is characterized by a first conveyor which is arranged directly behind the conveyor device of the system and by a cable depository for receiving the cables in the feed direction of the first conveyor. The number of manual operations is considerably reduced by the conveyor. At the same time, the efficiency of the finishing system may be increased, since the remaining share of manual operations, in terms of time, is limited. Additionally, depending on the further manufacturing steps, cable depositories of various designs may be used, since the cable does not simply drop on the depository but is pulled on it by the conveyor in a specific position.

The finishing of cables of relatively great length involves the problem of delivering the finished cables upon completion of the finishing operation in such a way that the cable ends will not lie on the floor and become tangled. In a further embodiment of the invention it is therefore suggested that the cables be pulled over a depository which is interrupted in the direction in which the cables extend, and that a specific section of the length of the cables be fed into the interruption. At the end of the conveying operation, a cable then forms three loops on the depository thereby considerably reducing the cable's length. At the same time, it is also guaranteed that the different cable ends will be spatially separated from each other.

The three cable loops may be formed in various ways. For instance, it is possible to first pull the cable over an intermediate depository which is arranged between the first conveyor and the depository, the latter being provided with a second conveyor. Following the transfer to the intermediate depository, the cable is retained thereon at a specific point and a specific section of the cable is fed into the interruption by means of a second conveyor. Two points of the cable may also be conveyed at different speeds. To that end, the intermediate depository includes two conveyors which also assume the retaining function for the cable. But it is also possible that the specific section of the cable is fed into the interruption while the cable is still being pulled over the depository. A considerable acceleration of the process is thereby accomplished.

A further acceleration of the process can be achieved by arranging a separating device 88 between the intermediate depository 80 and the second conveyor 82 and by positioning a cable in relation to the depository 10 with the aid of the second conveyor 82 while the first conveyor 40 transfers another cable to the intermediate depository 80 at the same time. The separating device makes it possible to separate the successive steps from one another so that two otherwise only serially performed operations can take place simultaneously.

To further restrict the share of manual operations, a further development of the invention may provide for the automatic gathering of the cables by a device after positioning of the cables on the depository. The provision may be such that the cables lie only loosely side-by-side and on top of one another or are gathered in bundles or packages by appropriate means. The gathering of the cables may also be effected in various ways. For instance, the depository may be provided with a pusher which periodically or at batch intervals pushes the cables, which are positioned in front of the depository by the first conveyor, into another position. To avoid interruptions of the production process, the pusher may be provided with a cover and the depository with a shedder that interacts with the cover. Thus, with the pusher fully extended, it is possible for the cables, which continue to be fed, to drop on the cover and to be subsequently pushed from there by the shedder, on the depository as the pusher retracts. Another way of gathering the cables may be by moving the depository in periodic or batch-dependent intervals a specific distance, where the distance and the interval are governed by the number of cables to be gathered.

Another embodiment of the invention is constituted by providing between the first conveyor and the system a transfer device. This will further increase both the flexibility and speed of the process and the apparatus.

BRIEF DESCRIPTION OF THE DRAWINGS

The invention will be more fully explained hereafter with the aid of the drawings wherein.

DETAILED DESCRIPTION OF THE PREFERRED EMBODIMENT

The illustration of the inventional process and apparatus is based on a cable finishing system wherein the cable ends pass through the various processing stations of the system while arranged in parallel and side-by-side. Illustrated in FIGS. 1–4 is the end of a conveyor belt 100 of such a system. The conveyor belt 100 carries a number of cables retained by holders 102. However, the schematic illustration of a conveyor belt with the cable ends arranged in parallel and side-by-side does not limit the invention exclusively to that type of system.

Figure 1:
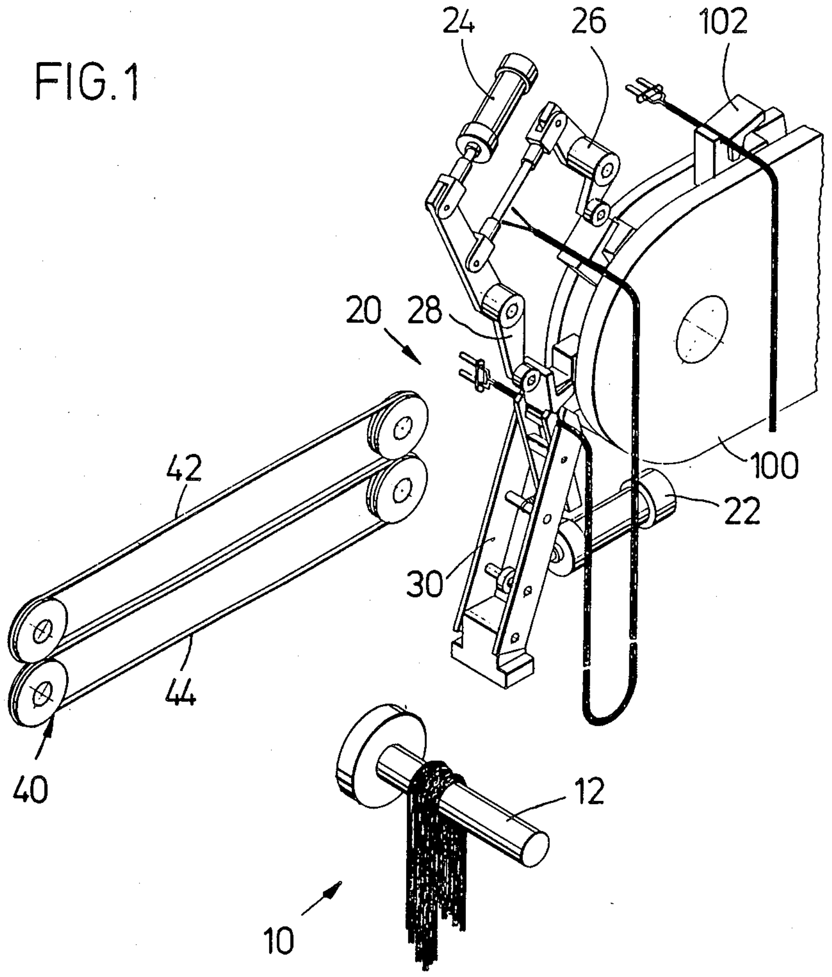
FIG. 1 shows a simplified perspective illustration of an unloading apparatus according to the invention for a cable finishing system.
Figure 2:
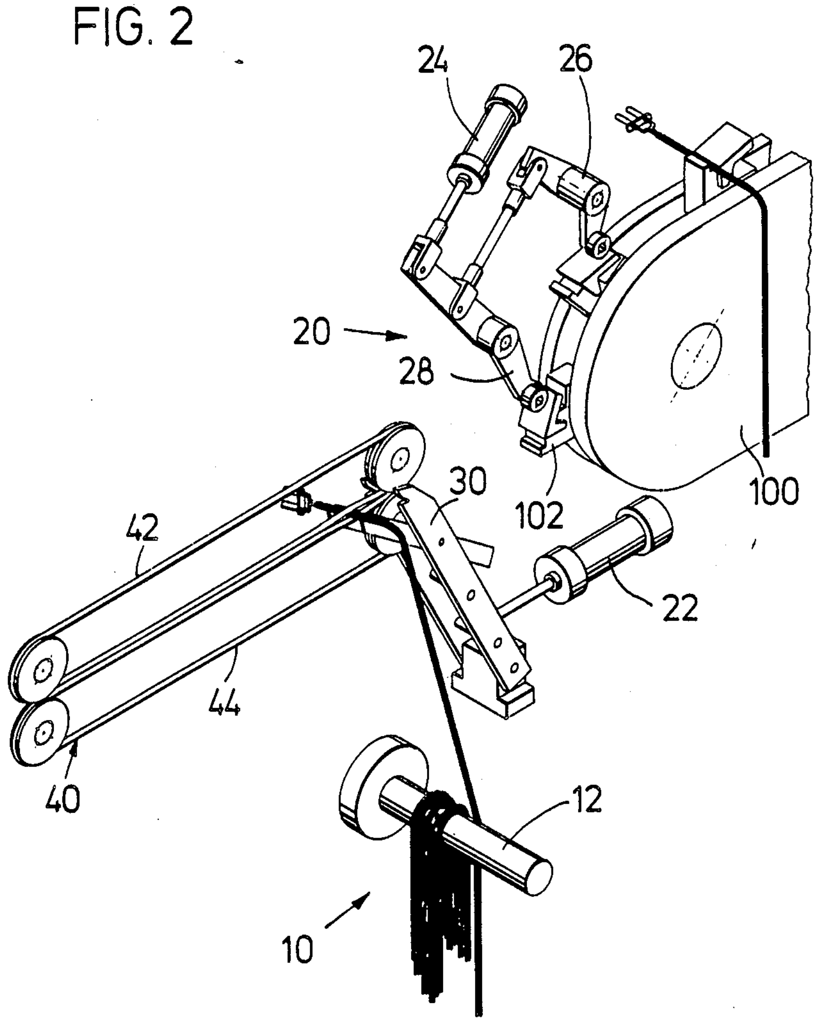
FIG. 2 shows the apparatus of FIG. 1 in position during the deposit of a cable.

Illustrated in FIGS. 1 and 2 is the simplest embodiment of the invention for unloading cable from a cable finishing system. This embodiment comprises an arbor 12 serving as depository 10, a transfer device 20 and a first conveyor 40. As shown in FIG. 1, one of the holders 102 of the conveyor 100 which carries the ends of a cable is first opened by means of a power cylinder 24 and a ram or a crank 26 of the transfer device 20. In the illustrated embodiment, the same power cylinder 24, by way of the crank 28, also opens at the same time, but farther back on the conveyor path, the holder 102 which carries the other cable end. Presently, the tilt position of the front-most holder on the reversing end of the conveyor belt ensures that the cable end will drop from the opened tongs of the holder in a transport device 30 of the transfer device 20. In contrast, the cable end retained by the rear holder drops to the floor. Naturally, it is also possible to let the cable front end drop to the floor while its rear end is picked up by the transfer device 20.

The transport device 30 may be variously designed. Presently it consists of two tong halves which are urged toward each other by a spring. Another power cylinder 22 swings the transport device out in such a way that the cable end which is held in transport device 30 will be picked up by two interacting conveyor belts 42, 44 of the first conveyor 40 and fed onward (FIG. 2). The first conveyor 40 then pulls approximately one-half of the cable over the arbor 12 that serves as depository 10, whereafter the conveyor belts 42, 44 release the cable end which until then has continued to be fed. The cables collected on the arbor 12 can then be removed in proper order. The first conveyor 40 may also be of any other suitable design. For example, it is conceivable that it is designed similar to the conveyor 100 of the system. This design would offer the advantage that the cable, by means of another power cylinder, can be released at any desired point of the first conveyor 40. Thus, cables of various lengths could be pulled over the depository 10 with a device of the same design. Additionally it is possible to deposit cables with unevenly long ends on the depository arbor 12.

Figure 3:
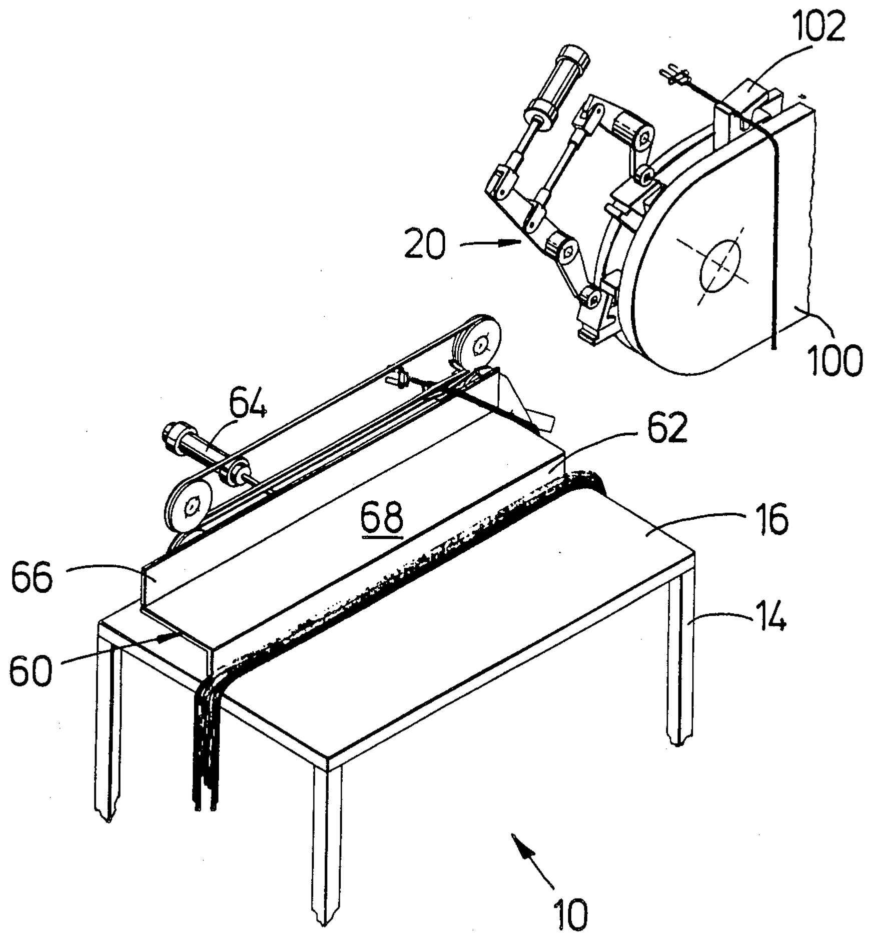
FIG. 3 shows a simplified perspective illustration of a second embodiment of the invention with a partly illustrated transfer device.

FIG. 3 depicts another embodiment of the apparatus. The transfer device 20 and the first conveyor 40 are identically the same as in the apparatus shown in FIGS. 1 and 2. In contrast, the depository 10 includes a table 14, the height of whose top 16 is somewhat less than the feed level of the first conveyor 40. Provided on the table is a device 60 for gathering the cables. It consists of a pusher 62 which, by means of a power cylinder 64, can be moved perpendicularly to the feed direction of the first conveyor. In its starting position, the pusher 62 is located underneath the first conveyor 40, with the cables delivered by the conveyor 40 located in front of the pusher. The pusher 62 is extended by the power cylinder 64, in adjustable periods or batch-dependent intervals, thus separating these cables spatially from those delivered by the first conveyor 40. This makes the cables available already bundled and ready for removal from the table for placement on a rack and suitable for further processing. To ensure a continued unloading while the pusher 62 is being extended, the pusher 62 is provided with a cover 68 arrayed across its entire width and extending parallel with the table top 16. The length of the cover 68 equals at least the entire extension length of the pusher 62. Cables which continue to be delivered during the extension motion of the pusher 62 can thus drop on its cover 68. As the pusher 62 retracts, these cables are pushed off by a shedder 66 which is fixed on the table 14 or on the first conveyor 40, so that the cables lie on the table top 16 in exactly the same position as the cables delivered by the conveyor 40. The cable gathering device 60 just described may also be installed in the same or a somewhat modified form on the apparatus illustrated in FIGS. 1 and 2.

The transfer device 20 can be dispensed with both in the apparatus according to FIGS. 1, 2 and 3. The first conveyor 40 is then moved right up to the conveyor 100 of the system.

Figure 4:
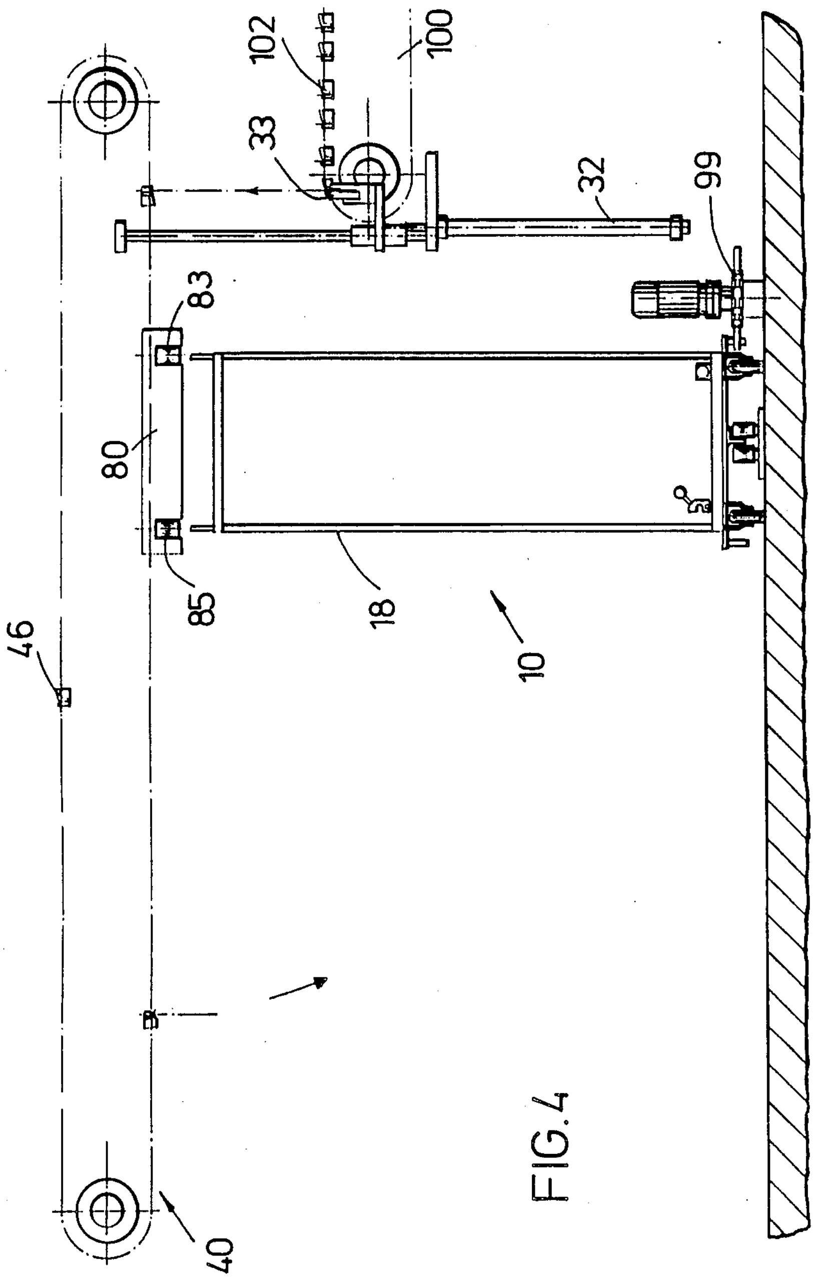
FIG. 4 shows a simplified elevational view of a third embodiment of the invention.
Figure 5:
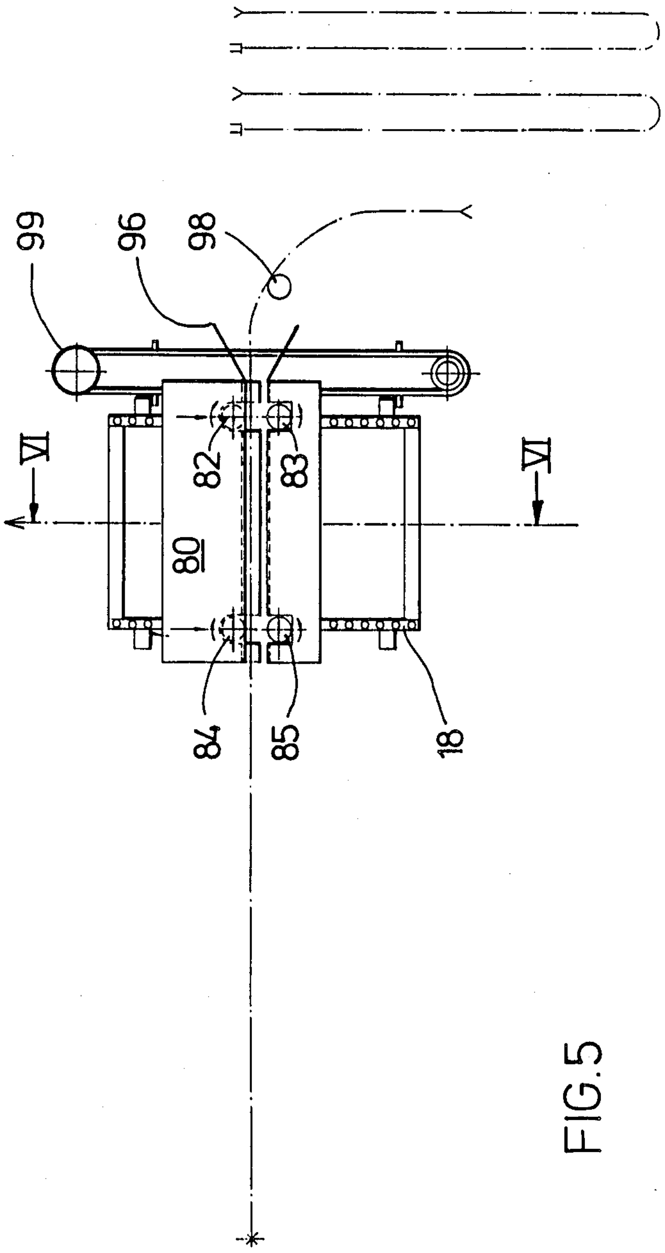
FIG. 5 shows a simplified plan view of the apparatus of FIG. 4.
Figure 6:
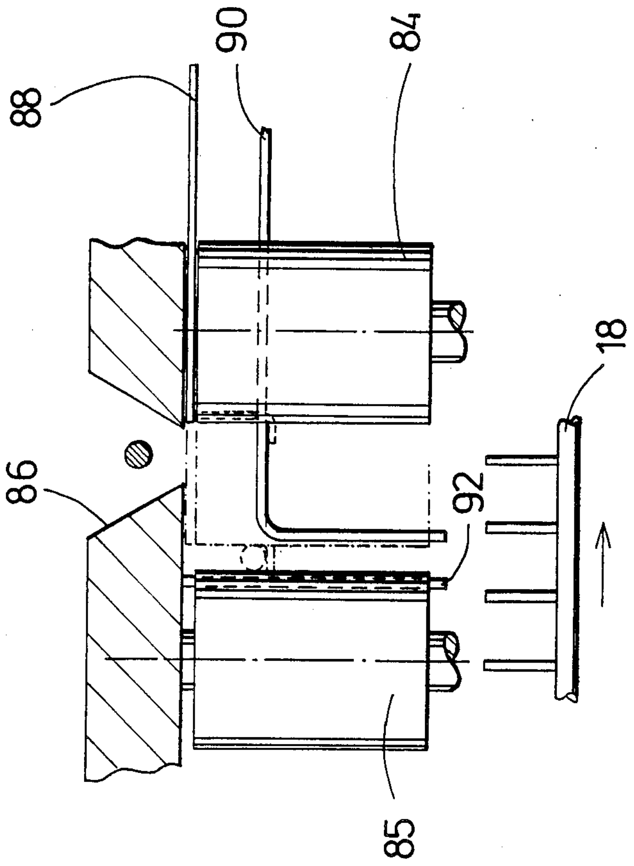
FIG. 6 shows a section along line VI—VI in FIG. 5.
Figure 7A:
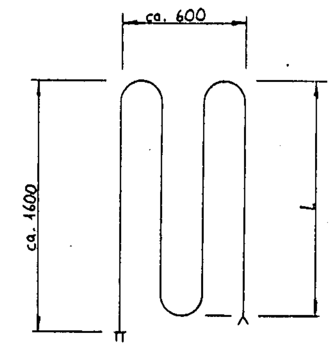
FIG. 7*a, b, c* show deposit patterns for the apparatus of FIG. 4.

Another embodiment of the apparatus for the application of the unloading method for a cable finishing system is illustrated in FIGS. 4–6 and suited specifically for cable lengths of more than 2 meters. However this apparatus may also be used for shorter cables. An elevator 32 provided with a holder 33 and serving in this apparatus as transfer device 20 picks up a cable end released by the conveyor 100 of the system and carries it to the first conveyor 40, which is installed at a sufficiently high level for the respective cable lengths. The cable is picked up by the first conveyor 40, which is provided with three holders 46, and pulled over an intermediate depository 80. A cart type rack 18 may be placed underneath the intermediate depository 80 as a final depository. By means of this rack, the deposited cables may then be moved to the location of further processing. This eliminates essentially any manual operation. Also, the rack 18 may be designed in accordance with further processing. On its top rack 18 includes, for instance, a horizontally arranged square frame. The two frame parts extending transverse to the feed direction of the first conveyor 40 are provided on their top sides with vertically oriented and evenly spaced pegs (19). The cables are finally deposited in the spaces between the pegs in various orientations. Several such orientations are illustrated in FIGS. 7*a*, *b*, *c* for cables of various lengths. These various orientations are generated with the aid of the intermediate depository 80.

The intermediate depository 80 includes a V-shaped cut 86 which extends parallel to the first conveyor 40 and is arranged beneath it while sealed on its bottom end with a horizontally movable bottom plate 88 which serves as a separating device. The bottom plate 88 is permanently secured to two rollers 82, 84 which in the feed direction of the first conveyor 40 are arranged successively and rotate on vertical axes. Unlike the rear roller 84, the first roller 82 is powered in the feed direction of the first conveyor 40. Two identical but stationary rollers 83, 85 are arranged opposite the two movable rollers 82, 84. The spacing in the feed direction between the front roller pair 82, 83 and the rear roller pair 84, 85 may be exactly equal to the spacing of the frame parts of the rack 18 which are provided with the pegs (19). Between the two roller pairs 82, 83; 84, 85 two guide plates 90, 92 are arranged, portions of which extend vertically. The guide plate 90 is arranged between the two horizontally movable rollers 82, 84 and has additionally a horizontal shank that extends beneath the opening of the V-shaped slot 86. The two guide plates 90, 92 form a slot in the feed direction which extends vertically and, similarly to the slots formed by the roller pairs 82, 83; 84, 85, is adjustable to the present cable shape.

Having picked up a cable from the elevator 32, the first conveyor 40 pulls it over the intermediate depository 80, and introduces the cable into the V-shaped slot 86 that is sealed by the bottom plate 88. This process is aided by a guide roller 98 with a vertical axle and by two guide plates 96 arranged in the entrance area of the V-shaped slot 86. As soon as the first conveyor passes the intermediate depository 80 with the cable picked up, the bottom plate 88 swings sideways along with the rollers 82, 84, permitting the cable to drop on the L-shaped guide plate 90. Next, the bottom plate 88 is restored to its home position with the two rollers 82, 84 and plate 90 supporting the cable. The cable is now being held by the two roller pairs 82, 83; 84, 85. Both the front roller pair 84, 85 in the feed direction of the first conveyor 40 and the rear pair 82, 83 may serve as braking rollers for the first conveyor 40. Together with the picked up cable end, the first conveyor 40 advances in the feed direction until arriving at a fixed stop (not illustrated). There, the cable end is dropped by the first conveyor 40 and thus forms the first shank of a loop. The stop location depends on the height of the cable end from the floor, on the rack 18, for instance such as required for further processing. At the same time or already at an earlier moment, the two powered rollers 82, 83 begin to feed the cable section which is located outside the intermediate depository 80, opposite to the feed direction, into the rack 18. The two rear rollers 84, 85 in the feed direction of the first conveyor 40 retain the cable in the process. As soon as the desired depth of the center cable loop has been reached (FIG. 7*a*), the two rollers 82, 84 together with the bottom plate 88 swing sideways permitting the cable to drop on the rack 18. Since the first conveyor 40 has in the meantime already picked up a new cable and pulled it across the intermediate depository 80, this new cable drops on the L-shaped guide plate 90 as the two rollers 82, 84 and the bottom plate 88 swing sideways. The cycle just described then begins anew.

Figure 7B:
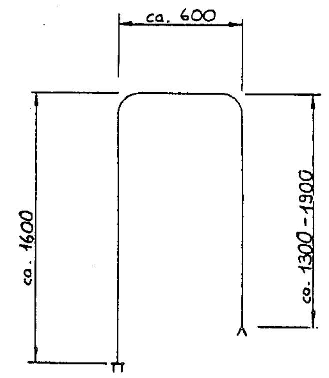

If the cable now is to be deposited on the rack according to FIG. 7*b*, this operation differs from the one just described in that the two powered rollers 82, 84 merely perform a holding function. As soon as the first conveyor 40 releases its picked up cable end, the two horizontally movable rollers 82, 84 can also swing sideways permitting the cable to drop in the form illustrated.

Figure 7C:
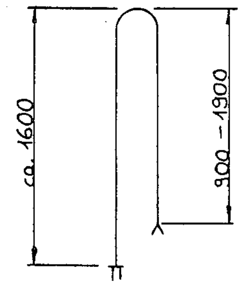

If it is desired to deposit the cable on the rack 18, according to FIG. 7*c*, the two powered rollers 82, 83 also feed the cable into the space formed by the frame of the rack 18.

Depending on space conditions at the operating site of the system, it might be that the first conveyor 40 cannot perform the swing-out motion which is necessary for the desired length of the one shank of the loop. In this case, the rear rollers 84, 85 of the intermediate depository 80, may also be powered in the feed direction. Depending on the desired form of the cable on the rack 18, the feed velocity of the two roller pairs 82, 83; 84, 85 may vary. The front roller pair 82, 83 in the feed direction will normally have a feed velocity greater than the rear roller pair 84, 85.

Depending on grade, size, shape and weight of the cable being conveyed, the hold-down pressure of the two roller pairs 82, 83; 84, 85 may be made variable. In the case of especially heavy cables, support rollers with horizontal axles or other means suitable for this function may also be provided located in front of, between and/or behind the intermediate depository.

To ensure that in each space between each two pegs (19) of the rack 18 the same number of cables will be deposited, additional provisions may be made, whereby a powered endless belt 99 moves the rack 18 in freely selectable periodic intervals a specific distance perpendicular to the feed direction of the first conveyor 80. This makes it possible to simultaneously pass several racks 18 continuously and successively past the unloading device. Depending on the design of the rack 18, the design of the conveyor belt 99 may vary.

Similarly to the case of the apparatuses according to FIGS. 1–3, the first conveyor 40 of the apparatus may be rolled up to the conveyor 100 of the system. The elevator 32 is then not required.

What is claimed is:

1. An unloading method for positioning a cable on a depository of a cable finishing system, characterized in the steps of: grasping a finished cable at a predetermined point on the cable, said point being determined by the location of a transfer device with respect to first and second conveyors for conveying said cable, pulling said cable over a depository, said depository having a surface with a discontinuity therein arranged in an axial direction of the cable for accommodating a loop in said cable, feeding a predetermined section of the cable into the discontinuity, and releasing the grasped cable point in a predetermiend position.

2. The method according to claim 1, characterized in that the predetermined section of a cable is fed into the discontinuity while the cable is being pulled over the depository.

3. The method according to claim 1 wherein the cable ends are arranged side-by-side in parallel during finishing and the cable forms a loop, characterized in that the cable loop is eliminated by a pull motion and in that the cable is placed on the depository in the form of at least one loop.

4. The method according to claim 1, characterized in that, after positioning a plurality of cables on the depository, the cables are automatically gathered on the depository by a gathering device, either individually or in batches at predetermined intervals.

5. An unloading apparatus for a cable finishing system and for grasping finished cables at predetermined points, characterized by a first conveyor means operatively associated with and arranged adjacent a second conveyor device of the system for grasping a cable and conveying said cable to a first cable depository, a transfer means arranged between the first conveyor means and the second conveyor device for transferring the cables from said cable finishing system to said conveyor means, said cable depository operatively associated with said first conveyor means for receiving the cable in the feed direction of the conveyor means, said cable depository including a surface having a discontinuity therein arranged in an axial direction of said cable whereby said first conveyor means feeds a predetermined section of the cable into said discontinuity to from a loop in the cable and said cable is deposited on said cable depository in a predetermined configuration.

6. The apparatus according to claim 5, including an intermediate depository for receiving cables from said first conveyor means having a second conveyor means for conveying cables from said intermediate depository to said cable depository and arranged between the first conveyor means and said cable depository.

7. The apparatus according to claim 6, including a separating means arranged between the intermediate depository and the second conveyor means for positioning a cable relative to the cable depository by means of the second conveyor means while another cable is simultaneously transported by the first conveyor means onto the intermediate depository.

8. The apparatus according to claim 5, including moving means for moving the cable depository a predetermined distance.

9. The apparatus according to claim 5, wherein the cable depository includes a means for automatically gathering of deposited cables.

* * * * *